United States Patent
Kwon et al.

(10) Patent No.: US 8,457,566 B2
(45) Date of Patent: Jun. 4, 2013

(54) PREAMBLE TRANSMISSION METHOD IN A MULTIPLE ANTENNA SYSTEM

(75) Inventors: Yeong Hyeon Kwon, Anyang-si (KR); Min Seok Noh, Anyang-si (KR); Jin Sam Kwak, Anyang-si (KR); Dong Cheol Kim, Anyang-si (KR); Sung Ho Moon, Anyang-si (KR); Seung Hee Han, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 110 days.

(21) Appl. No.: 12/993,653

(22) PCT Filed: May 20, 2009

(86) PCT No.: PCT/KR2009/002659
§ 371 (c)(1),
(2), (4) Date: Nov. 19, 2010

(87) PCT Pub. No.: WO2009/142437
PCT Pub. Date: Nov. 26, 2009

(65) Prior Publication Data
US 2011/0070850 A1   Mar. 24, 2011

Related U.S. Application Data

(60) Provisional application No. 61/054,487, filed on May 20, 2008, provisional application No. 61/055,132, filed on May 21, 2008, provisional application No. 61/055,466, filed on May 23, 2008.

(30) Foreign Application Priority Data

Nov. 28, 2008   (KR) .......................... 10-2008-0119399
Nov. 28, 2008   (KR) .......................... 10-2008-0119400

(51) Int. Cl.
*H04B 1/04* (2006.01)

(52) U.S. Cl.
USPC ............ 455/103; 370/280; 370/350; 375/267

(58) Field of Classification Search
USPC ......................................................... 455/103
See application file for complete search history.

(56) References Cited

U.S. PATENT DOCUMENTS

| | | | |
|---|---|---|---|
| 8,144,798 B2 * | 3/2012 | Trachewsky et al. | 375/267 |
| 2006/0028976 A1 | 2/2006 | Park et al. | |
| 2007/0171811 A1 | 7/2007 | Lee et al. | |
| 2008/0192869 A1 * | 8/2008 | Goel et al. | 375/345 |
| 2009/0060088 A1 * | 3/2009 | Callard et al. | 375/299 |
| 2009/0323563 A1 * | 12/2009 | Ho et al. | 370/280 |
| 2010/0054235 A1 * | 3/2010 | Kwon et al. | 370/350 |
| 2011/0299618 A1 * | 12/2011 | Hammerschmidt et al. | 375/267 |

FOREIGN PATENT DOCUMENTS

WO   WO 2005/006700   1/2005

* cited by examiner

*Primary Examiner* — Ajibola Akinyemi
(74) *Attorney, Agent, or Firm* — McKenna Long & Aldridge LLP

(57) ABSTRACT

A method of transmitting a preamble for synchronization in a multiple-antenna system includes applying a masking sequence to a plurality of preambles, and transmitting each of the plurality of preambles, to which the masking sequence is applied, through each of a plurality of transmit antennas. In a multiple-antenna system, deterioration of reception performance for a preamble can be reduced.

4 Claims, 15 Drawing Sheets

FIG. 8

|  | $T_1$ | $T_2$ | $\cdots$ | $T_M$ |
|---|---|---|---|---|
| 1st ANTENNA : | $P(1) * s^1(1)$ | $P(1) * s^2(1)$ | | $P(1) * s^M(1)$ |
| 2nd ANTENNA : | $P(2) * s^1(2)$ | $P(2) * s^2(2)$ | | $P(2) * s^M(2)$ |
| | $\vdots$ | $\vdots$ | | $\vdots$ |
| N-th ANTENNA : | $P(N) * s^1(N)$ | $P(N) * s^2(N)$ | | $P(N) * s^M(N)$ |

PREAMBLE TRANSMISSION METHOD IN A MULTIPLE ANTENNA SYSTEM

This application claims the benefit of priority of U.S. Provisional Application No. 61/054,487 filed on May 20, 2008, U.S. Provisional Application No. 61/055,132 filed on May 21, 2008, U.S. Provisional Application No. 61/055,466 filed on May 23, 2008, Korean Patent Application No. 10-2008-0119400 filed on Nov. 28, 2008, Korean Patent Application No. 10-2008-0119399 filed on Nov. 28, 2008 and PCT Application No. PCT/KR2009/002659 filed May 20, 2009, all of which are incorporated by reference in their entirety herein.

TECHNICAL FIELD

The present invention relates to a multiple-antenna system, and more particularly, to a method and apparatus for transmitting a preamble for synchronization by using multiple antennas.

BACKGROUND ART

Wireless communication systems are widely spread all over the world to provide various types of communication services such as voice or data. In general, the wireless communication system is a multiple access system capable of supporting communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

To overcome performance deterioration caused by channel fading of wireless communication, many researches have been conducted on spatial diversity and/or spatial multiplexing using a multiple input multiple output (MIMO) system. The MIMO system is implemented such that a transmitter and a receiver have two or more antennas, thereby providing advantages such as a high data rate, reliability improvement, channel capacity increase, etc.

In the wireless communication system, a user equipment (UE) performs cell search for initialization or handover. For example, after power is on, the UE performs initial cell search to select a cell for initially receiving a service. The cell search is a process for attaining downlink synchronization and for attaining a cell identifier (ID). A signal used in the cell search is called differently according to a system, such as a synchronization channel, a synchronization signal, a midamble, and a preamble.

A universal mobile telecommunications system (UMTs) of $3^{rd}$ generation partnership project (3GPP) based on wideband code division multiple access (WCDMA) divides 512 long pseudo noise (PN) scrambling codes into 64 code groups to facilitate the cell search, and uses a primary synchronization channel and a secondary synchronization channel. The primary synchronization channel is used by the UE to attain slot synchronization. The secondary synchronization channel is used to attain frame synchronization and scrambling code groups.

Evolved-UMTS (E-UMTS) of 3GPP is called long term evolution (LTE), and a primary synchronization signal and a secondary synchronization signal are used in the cell search. The section 6.11 of 3GPP TS 36.211 V8.2.0 (2008-03) "Technical Specification Group Radio Access Network; Evolved Universal Terrestrial Radio Access (E-UTRA); Physical Channels and Modulation (Release 8)" may be incorporated herein by reference. The primary synchronization signal uses three synchronization sequences to indicate a cell group ID. The secondary synchronization signal indicates one of 168 cell IDs. Therefore, by using the primary synchronization signal and the secondary synchronization signal, one of 504 cell IDs in total can be identified.

Institute of electrical and electronics engineers (IEEE) 802.16e is also called WiMax, and uses a preamble that appears in the first position of each frame in the cell search. The preamble consists of a subcarrier set configured with a spacing of three subcarriers in a frequency domain, and has a characteristic in that the same waveform is repeated 3 times in a time domain. Further, neighboring cells use different subcarrier sets.

The use of multiple antennas is inevitable in a next generation wireless communication system to increase spectral efficiency. Since transmit power of each transmit antenna is allocated constantly in a MIMO system in general, it is preferable to utilize all of the multiple antennas to maximize output power in a transmitter. However, the multiple antennas are not considered in the aforementioned cell search process in the conventional wireless communication system.

Therefore, there is a need for a method capable of supporting multiple antennas in a cell search process.

DISCLOSURE

Technical Problem

The present invention provides a method of transmitting a preamble in a multiple-antenna system.

Technical Solution

In an aspect, a method of transmitting a preamble for synchronization in a multiple-antenna system includes applying a masking sequence to a plurality of preambles, and transmitting each of the plurality of preambles, to which the masking sequence is applied, through each of a plurality of transmit antennas.

In another aspect, a method of transmitting a preamble for synchronization in a multiple-antenna system includes transmitting a plurality of preambles through a first transmit antenna, and transmitting the plurality of preambles through a second transmit antenna, wherein the plurality of preambles are arranged in interlaced subcarriers.

In still another aspect, a transmitter includes a plurality of transmit antennas, and a preamble generator configured for generating a plurality of preambles arranged in interfaced subcarriers and transmitted through the plurality of antennas.

Advantageous Effects

In a multiple-antenna system, deterioration of reception performance for a preamble caused by a subcarrier null can be reduced. Therefore, delay can be avoided in a cell search or handover process, and system reliability can be improved.

DESCRIPTION OF DRAWINGS

FIG. 8 shows an example of preamble transmission according to an embodiment of the present invention.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE.

A preamble is a signal used to attain synchronization in a cell search process or the like. The preamble is also called a midamble, a synchronization signal, or a synchronization channel according to a system. The preamble may be used to attain a cell identifier (ID) as one signal. Alternatively, the cell ID may be attained by using two signals such as a primary synchronization signal and a secondary synchronization signal.

Figure 1:
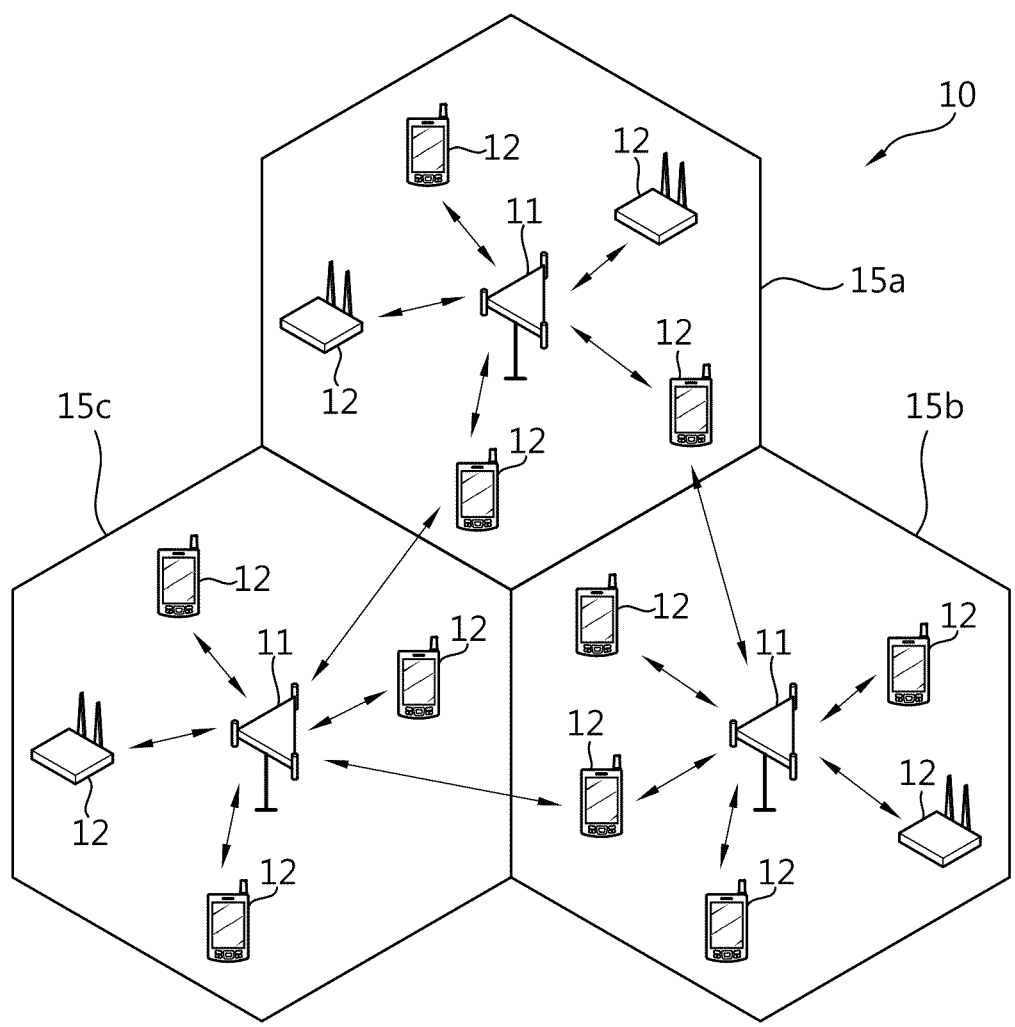
FIG. 1 shows a wireless communication system.

FIG. 1 shows a wireless communication system. A wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, downlink implies communication from the BS to the UE, and uplink implies communication from the UE to the BS. In the downlink, a transmitter may be a part of the BS, and a receiver may be a part of the UE. In the uplink, the transmitter may be a part of the UE, and the receiver may be a part of the BS.

Figure 2:
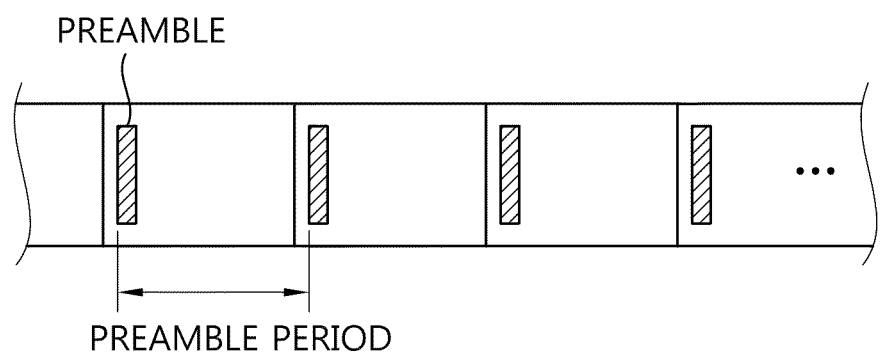
FIG. 2 shows an example of periodic preamble transmission.

FIG. 2 shows an example of periodic preamble transmission. A preamble period denotes a period in which a preamble is transmitted. The preamble period may correspond to a radio frame unit or a superframe unit. That is, the preamble may be transmitted in every radio frame or every superframe. When the preamble is periodically transmitted, a UE may detect the preamble by accumulating the preamble in every preamble period, thereby improving preamble detection capability.

Now, a preamble structure for synchronization in a multiple-antenna system will be described under the premise of the periodic preamble transmission.

Several methods may be used for a preamble that supports multiple antennas. For example, through the multiple antennas, preambles may be transmitted based on a cyclic delay diversity (CDD) or based on frequency division multiplexing (FDM). CDD-based transmission may have a different gain according to a delay amount. A small delay can increase a diversity gain, and a large delay can increase channel estimation capability. FDM-based transmission uses multiple antennas for respective subcarriers or in a subcarrier set unit. The former implies that preambles are transmitted in a distributed manner in a subcarrier unit for each antenna across a band in which the preambles are transmitted, and the latter implies that the preambles are transmitted by grouping them in a unit of one or more subcarrier sets for each antenna. When the preambles are transmitted in a subcarrier unit, channel estimation is possible in a full band, but many repetition patterns may appear for each antenna in a time domain. When the preambles are transmitted in a subcarrier set unit, channel information may be limited to a part of the band.

In the multiple-antenna system, the CDD-based preamble transmission satisfies a cyclic delay between preambles for respective antennas, which leads to a different beamforming result for each subcarrier in a frequency domain. More specifically, the CDD-based transmission has a problem in that a 'subcarrier null' may be generated in a receiver according to an environment of a radio channel connected from a transmitter to the receiver. The subcarrier null means a case where a magnitude of response is less than or equal to a certain value in a particular subcarrier.

In order to transmit a preamble by using multiple antennas, a well-known method such as space frequency block code (SFBC) and space time block code (STBC) can be taken into account. However, such a method also has a problem in that the 'subcarrier null' may be generated in the receiver according to the environment of the radio channel connected from the transmitter to the receiver. The subcarrier null implies a case where a magnitude of response is less than or equal to a certain value in a particular subcarrier. When the subcarrier null occurs, reception reliability of response may be problematic in a corresponding subcarrier. The subcarrier null is generated to the maximum extent by using the delay diversity. According to a delay amount, the subcarrier null is generated in a different amount.

Figure 3:
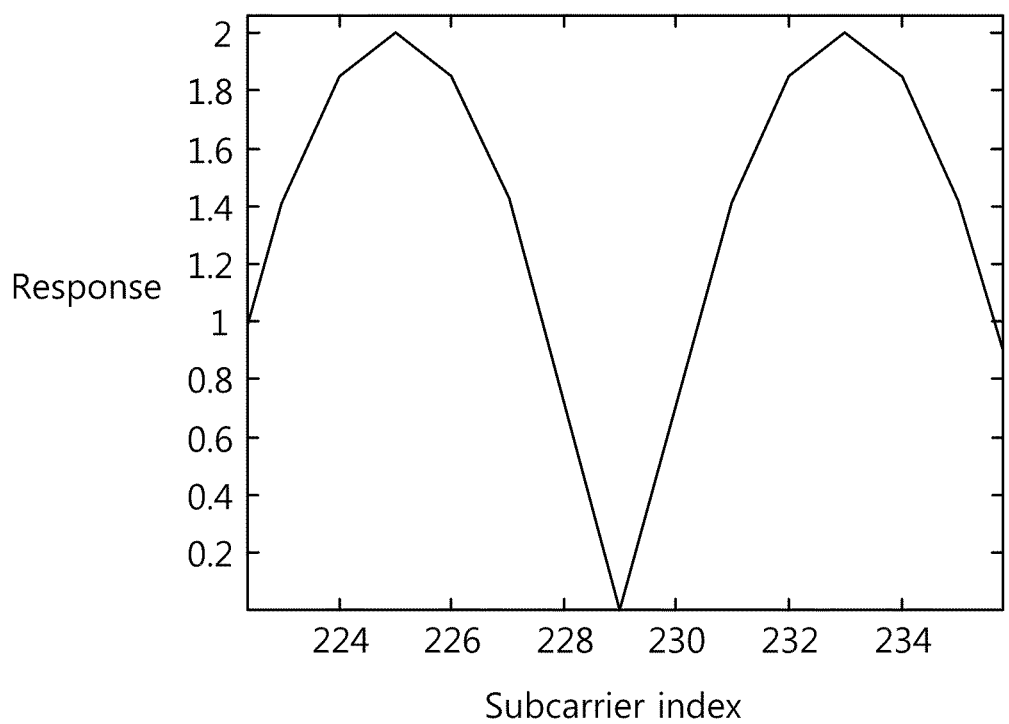
FIG. 3 is a graph showing a response in a receiver of a system using two transmit antennas.

FIG. 3 is a graph showing a response in a receiver of a system using two transmit (Tx) antennas. A subcarrier null appears at a subcarrier of which index is 229. When the subcarrier null occurs, reception reliability of the response may be problematic in a corresponding subcarrier.

Figure 4:
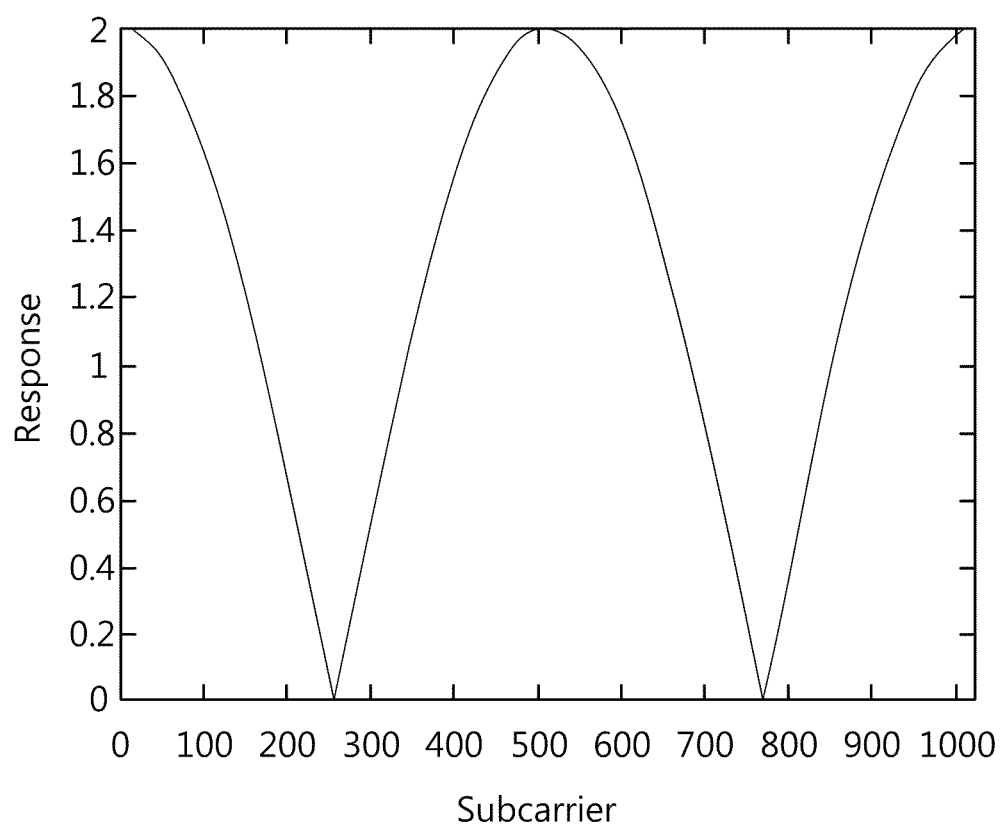
FIG. 4 is a graph showing a response in a receiver in a case where a delay amount is two samples when using a delay diversity.
Figure 5:
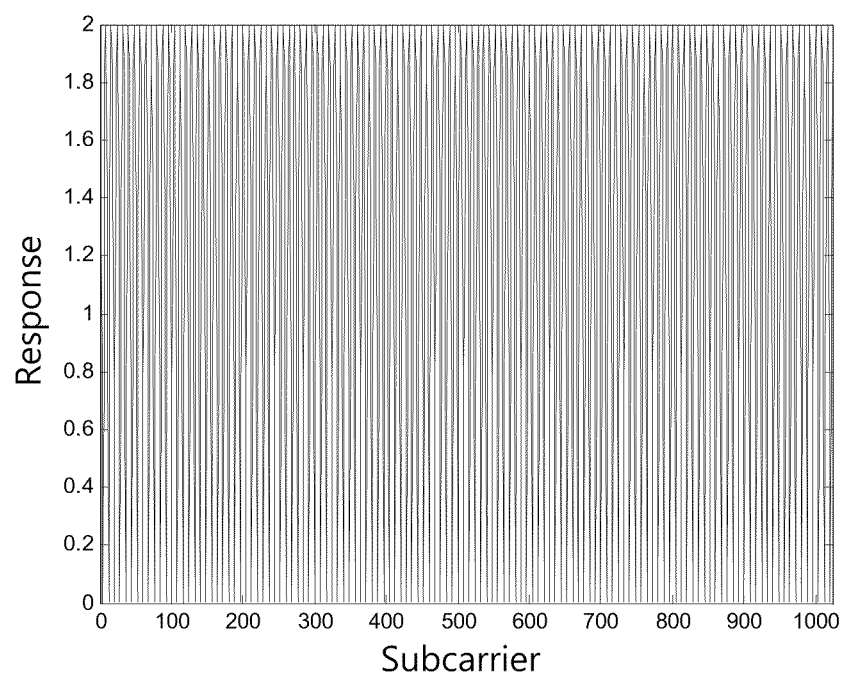
FIG. 5 is a graph showing a response in a receiver in a case where a delay amount is 128 samples when using a delay diversity.

FIG. 4 is a graph showing a response in a receiver in a case where a delay amount is two samples when using a delay diversity. FIG. 5 is a graph showing a response in a receiver in a case where a delay amount is 128 samples when using a delay diversity. When a smaller number of samples are delayed, an area in which the subcarrier null occurs becomes more localized, and when a greater number of samples are delayed, the area in which the subcarrier null occurs is distributed evenly across a full band. The total number of subcarriers in which subcarrier null occurs is greater in case of a small delay than a greater delay.

When the multiple-antenna system transmits a preamble by using a cyclic delay diversity (CDD) which is one of delay diversities, sufficiently many delay samples (i.e., a relatively large delay) is required in order for a receiver to estimate a channel for each antennal. In this case, many subcarrier nulls can occur as shown in FIG. 5, which may lead to a loss of a Tx signal.

Figure 6:
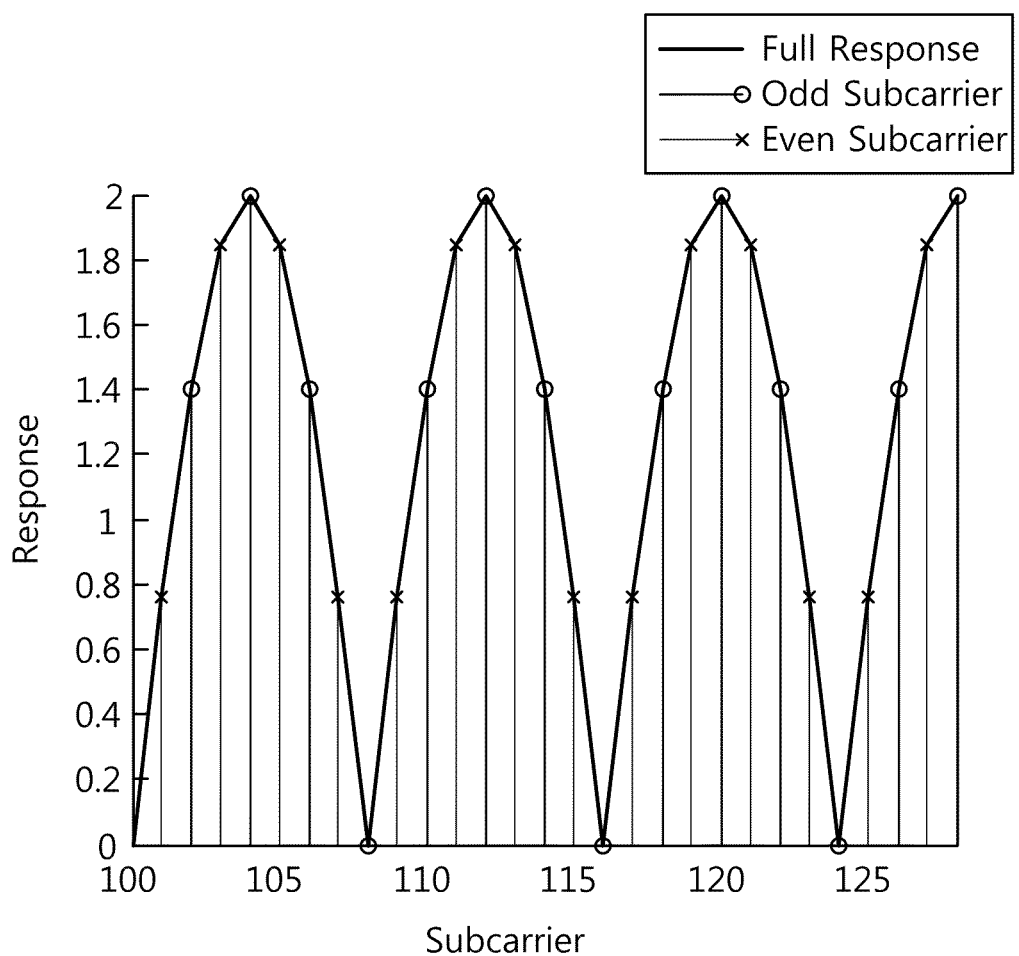
FIG. 6 is a graph showing a response which appears for each subcarrier in a receiver when using two transmit antennas.
Figure 7:
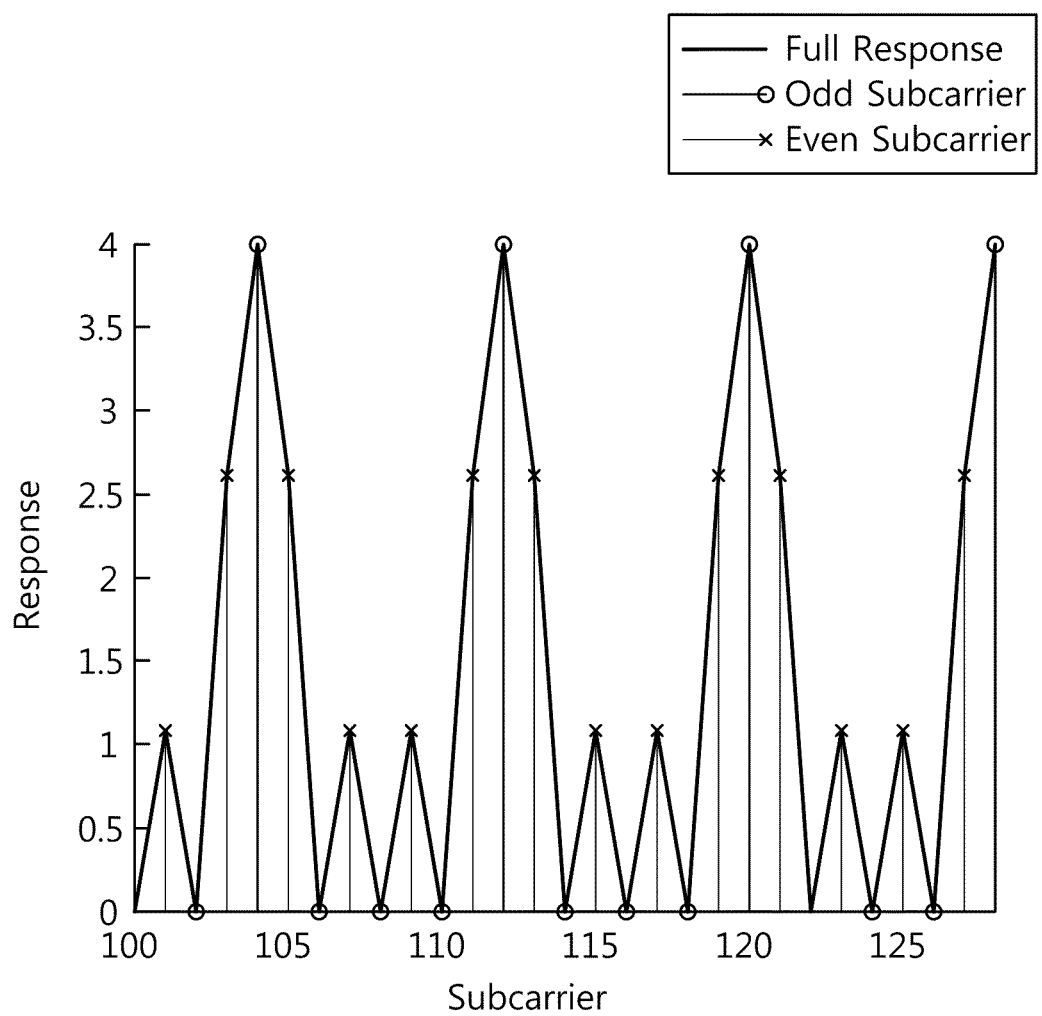
FIG. 7 is a graph showing a response which appears for each subcarrier in a receiver when using four transmit antennas.

FIG. 6 is a graph showing a response which appears for each subcarrier in a receiver when using two Tx antennas. FIG. 7 is a graph showing a response which appears for each subcarrier in a receiver when using four Tx antennas. A delay amount applied for each antenna is equal to a ⅛ OFDM symbol length. It is shown that a significant amount of subcarrier nulls can occur similarly to the case of using a single antenna. When using the four Tx antennas, there may be a problem in which the receiver receives only a response that appears only in an odd subcarrier in a particular part according to a channel combination of the antennas. This implies that reception capability of the system may rapidly deteriorate in a particular situation when beamforming or precoding varies depending on a channel state of each Tx antenna.

Hereinafter, a method for avoiding a subcarrier null when using a delay diversity will be described. With this method, reception signal deterioration caused by a subcarrier null in a receiver can be decreased according to a channel state.

FIG. 8 shows an example of preamble transmission according to an embodiment of the present invention. N denotes the number of Tx antennas. M denotes the number of masking sequences $s^m$ (0<m<M+1) applied to a preamble, and can be regarded as a period in which the same masking sequence is applied to the preamble. P(n) (0<n<N+1) denotes a preamble transmitted through an $n^{th}$ Tx antenna, and $s^m(n)$ denotes an element of a masking sequence of the $n^{th}$ Tx antenna at an $m^{th}$ time. Therefore, a length of the masking sequence is equal to the number of Tx antennas.

Referring to FIG. 8, a preamble P(n) corresponding to each Tx antenna at a time $T_1$ is masked by a masking sequence $s^1$. $s^1(1)$ is applied to a preamble P(1) in a $1^{st}$ Tx antenna. $s^1(2)$ is applied to a preamble P(2) in a $2^{nd}$ Tx antenna. $s^1(N)$ is applied to a preamble P(N) in an $N^{th}$ Tx antenna. Next, a preamble P(n) corresponding to each Tx antenna at a time $T_2$ is masked by a masking sequence $s^2$. A preamble P(n) corresponding to each Tx antenna at a time $T_M$ is masked by a masking sequence $s^M$.

The times $T_1, T_2, \ldots, T_M$ may correspond to a period in which a preamble is transmitted or may correspond to a multiple of the period. For example, if the preamble is transmitted with a period of 10 ms, a masking sequence may be applied to the preamble in every 10 ms.

The number M of the masking sequences may depend on the number N of Tx antennas. For example, if the number of Tx antennas is 2, the number of masking sequences may be set to 2.

An orthogonal sequence may be used as the masking sequence. This implies that orthogonal sequences $s^i$ and $s^j$ (i≠j) corresponding to different times are orthogonal to each other. Table 1 shows an example of the masking sequence having an orthogonal characteristic when the number of Tx antennas is 2, 3, and 4.

TABLE 1

| | $s^m$ |
|---|---|
| N = 2<br>M = 2 | $s^1 = [+1\ +1]\ s^2 = [+1\ -1]$ |
| N = 3<br>M = 3 | $s^1 = [+1\ +1\ +1],\ s^2 = [1\ e^{j2\pi/3}\ e^{j4\pi/3}],\ s^3 = [1\ e^{j4\pi/3}\ e^{j2\pi/3}]$ |
| N = 4<br>M = 4 | $s^1 = [+1\ +1\ +1\ +1]\ s^2 = [+1\ -1\ +1\ -1]$<br>$s^3 = [+1\ +1\ -1\ -1]\ s^4 = [+1\ -1\ -1\ +1]$ |

When preambles to which the masking sequence is allocated are transmitted through multiple antennas, the receiver calculates a weighted sum by using the masking sequence applied to the preamble of each Tx antenna in a process of detecting the preamble by accumulating the preamble in every preamble period. Unless there is no significant channel change, the receiver can detect the preamble by distinguishing the preamble for each Tx antenna. Therefore, preamble detection capability can be improved.

In another embodiment, a constant amplitude zero autocorrelation (CAZAC) sequence can be used as the masking sequence. A $k^{th}$ element of a Zadoff-Chu (ZC) CAZAC sequence which is one of CAZAC sequences can be expressed by Equation 1 below:

$$c(k) = \exp\left\{-\frac{j\pi Rk(k+1)}{L}\right\} \text{ where } L \text{ is odd} \quad \text{[Equation 1]}$$

$$c(k) = \exp\left\{-\frac{j\pi Rk^2}{L}\right\} \text{ where } L \text{ is even}$$

where R denotes a root index, and L denotes a ZC sequence length. The root index R is a relatively prime to L. In this case, a masking sequence having a length of N can be attained from the ZC sequence by using various methods. For example, a masking sequence having a length N=4 can be directly attained from a ZC sequence having a length L=4. Alternatively, the masking sequence having a length N=4 can be attained by extending a ZC sequence having a length L=3. The masking sequence having a length N=4 can be attained by truncating a ZC sequence having a length L=5.

When the CAZAC sequence is used as the masking sequence, a start position at which the sequence is applied can be easily estimated. This is because, according to a characteristic of zero autocorrelation, if a weighted sum is calculated by using a masking sequence of a particular desired Tx antenna, a preamble can be detected only at a correct time point at which the corresponding masking sequence is applied.

In another example, a cyclically shifted sequence may be used as the masking sequence. The cyclically shifted sequence may be generated by cyclically shifting a base sequence by a cyclic shift amount. Various types of sequences can be used as the base sequence. For example, well-known sequences such as a pseudo noise (PN) sequence and a Zadoff-Chu (ZC) sequence can be used as the base sequence. The receiver can detect a preamble of a particular Tx antenna when accumulating the preamble by applying a corresponding masking sequence. This implies that preambles for all Tx antennas can be known at any point if a cyclic shift amount is known.

The aforementioned subcarrier null problem occurs when the same preamble is transmitted in every preamble transmission period in each Tx antenna. Therefore, by changing a preamble transmitted through each Tx antenna in every preamble transmission period, a position of a null can be changed. Herein, the null is generated when the same preamble is continuously transmitted through the same Tx antenna. That is, since beamforming is a sum of a channel and a beamforming vector in the multiple-antenna system, when a transmitter performs transmission while changing a Tx antenna, a subcarrier null is regulated for a subcarrier used by the preamble unless all channels connected from the Tx antenna to a receive (Rx) antenna are identical.

Figure 9:
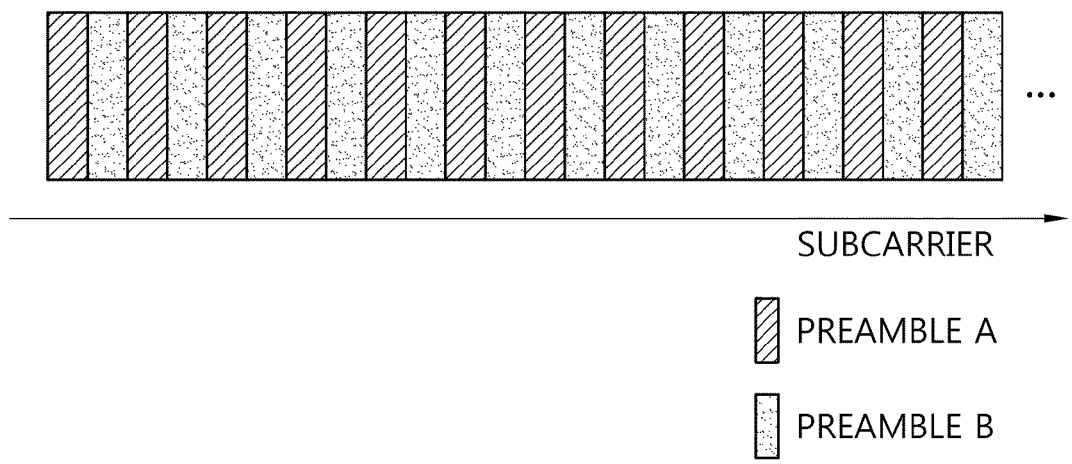
FIG. 9 shows an example of preamble transmission according to another embodiment of the present invention.

FIG. 9 shows an example of preamble transmission according to another embodiment of the present invention. A preamble A and a preamble B are inserted in an interlaced manner in frequency domain. The preamble A is used in a $(2n)^{th}$ subcarrier, and the preamble B is used in a $(2n+1)^{th}$ subcarrier. Accordingly, at least one of the preambles A and B can deliver information correctly even if a channel state deteriorates in any possible combination.

The preambles A and B may use different sequences. Alternatively, a sequence having a particular relation such as a cyclic shift or a reverse relation may be used as the preambles A and B. The preambles A and B may use the same sequence. The preambles A and B may represent one cell ID so that they have a complementary relation with each other in a detection operation.

Figure 10:
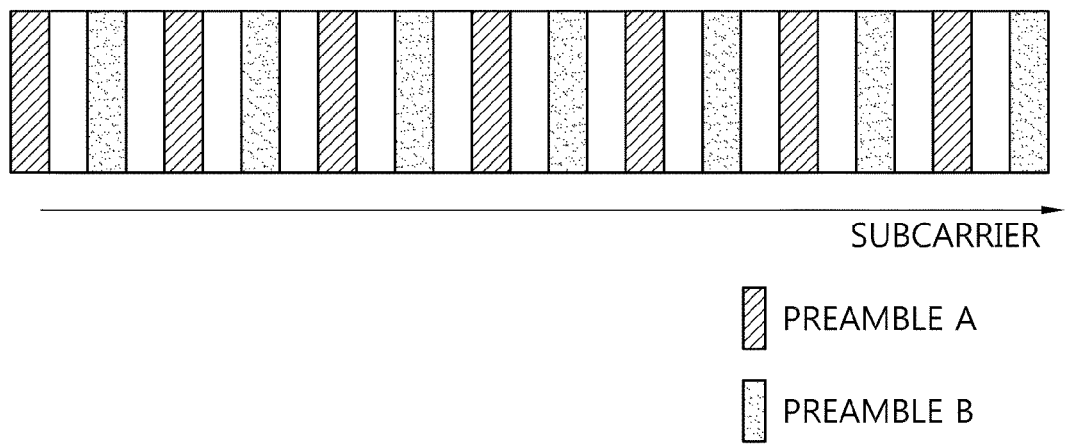
FIG. 10 shows an example of preamble transmission according to another embodiment of the present invention.

FIG. 10 shows an example of preamble transmission according to another embodiment of the present invention. In this case, a preamble has a repetition pattern in a time domain, unlike in the embodiment of FIG. 9. In order for the preamble to appear repetitively in the time domain, a subcarrier spacing is provided by a repetition count in a frequency domain. That is, to be repeated two times in the time domain, an available subcarrier is used as a double spacing. For transmission of a preamble having a repetition pattern in the time domain, a subcarrier spacing is defined by a repetition count without having to use all subcarriers in preamble transmission. However, the aforementioned subcarrier null may be generated when the repetition pattern is defined. Therefore, in order to avoid performance deterioration caused by the subcarrier null, preambles A and B are arranged in an interlaced manner with a spacing of a plurality of subcarriers. This implies that at least one null subcarrier is arranged between the preamble A and the preamble B.

In this case, the preambles A and B are arranged with a spacing of two subcarriers, and thus the preambles are repeated two times in the time domain. Therefore, even if a response signal is weakened in one of the preambles A and B due to the subcarrier null, an original characteristic can be maintained by the other preamble.

Figure 11:
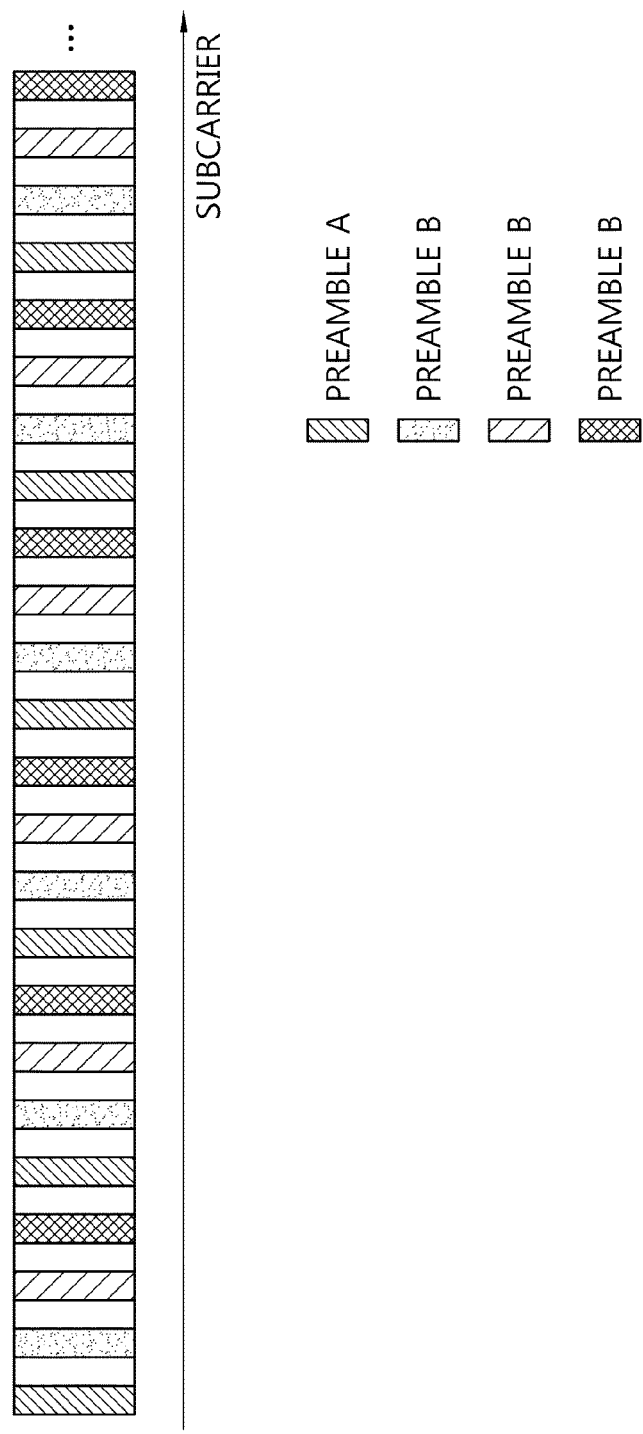
FIG. 11 shows an example of preamble transmission according to another embodiment of the present invention.

FIG. 11 shows an example of preamble transmission according to another embodiment of the present invention. Four preambles A, B, C, and D are inserted in an interlaced manner with a spacing of two subcarriers in a frequency domain. More subcarrier nulls may be generated in case of using 4 Tx antennas in comparison with a case of using 2 Tx antennas. In this case, by arranging the 4 preambles in an interlaced manner, reception capability deterioration caused by the subcarrier null is decreased.

The preambles A, B, C, and D may use different sequences. Alternatively, a sequence having a particular relation such as a cyclic shift or a reverse relation may be used as the preambles A, B, C, and D. The preambles A, B, C, and D may use the same sequence. The preambles A, B, C, and D may represent one cell ID so that they have a complementary relation with one another in a detection operation.

It is shown herein that the preambles A, B, C, and D are arranged with a spacing of two subcarriers, so that the preambles are repeated two times in the time domain. However, this is for exemplary purposes only, and thus the subcarrier spacing may vary. In addition, a different subcarrier spacing can be defined among the preambles A, B, C, and D.

Figure 12:
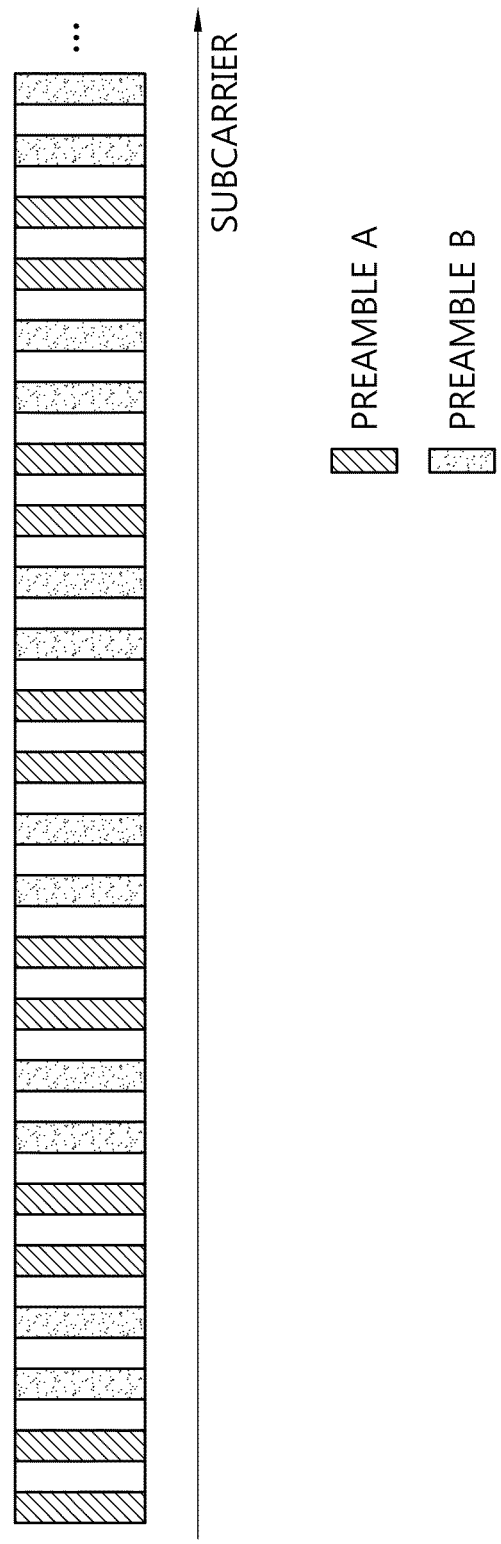
FIG. 12 shows an example of preamble transmission according to another embodiment of the present invention.

FIG. 12 shows an example of preamble transmission according to another embodiment of the present invention. In this example, two preambles A and B are arranged in an interfaced manner by being repeated two times. In this manner, there is an advantage in that a longer sequence can be used as the preamble. The number of preambles in use or a preamble repetition count is shown for exemplary purposes only. For example, the preambles A and B may be arranged in an interlaced manner by being repeated four times. Alternatively, the preambles A, B, C, and D may be arranged in an interlaced manner by being repeated two times.

Now, a method capable of decreasing an effect caused by a subcarrier null by using a relation of preamble sequences will be described.

Figure 13:
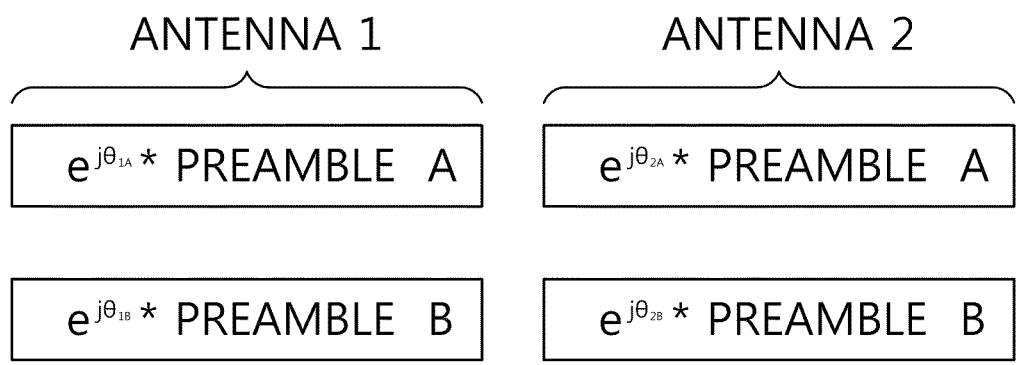
FIG. 13 shows an example of preamble transmission according to another embodiment of the present invention.

FIG. 13 shows an example of preamble transmission according to another embodiment of the present invention. In this case, a phase shift is applied to preambles for respective Tx antennas. Hereinafter, $\theta_{kA}$ denotes a phase applied to an $A^{th}$ preamble in a $k^{th}$ Tx antenna. The phase shift is applied when using two Tx antennas and two preambles A and B. The preambles A and B are transmitted using interlaced subcarriers through a $1^{st}$ Tx antenna. The preamble A and B are transmitted using interlaced subcarriers through a $2^{nd}$ Tx antenna. In this case, a different phase can be applied for each Tx antenna and/or for each preamble. In doing so, a problem caused by a subcarrier null can be selectively solved.

Figure 14:
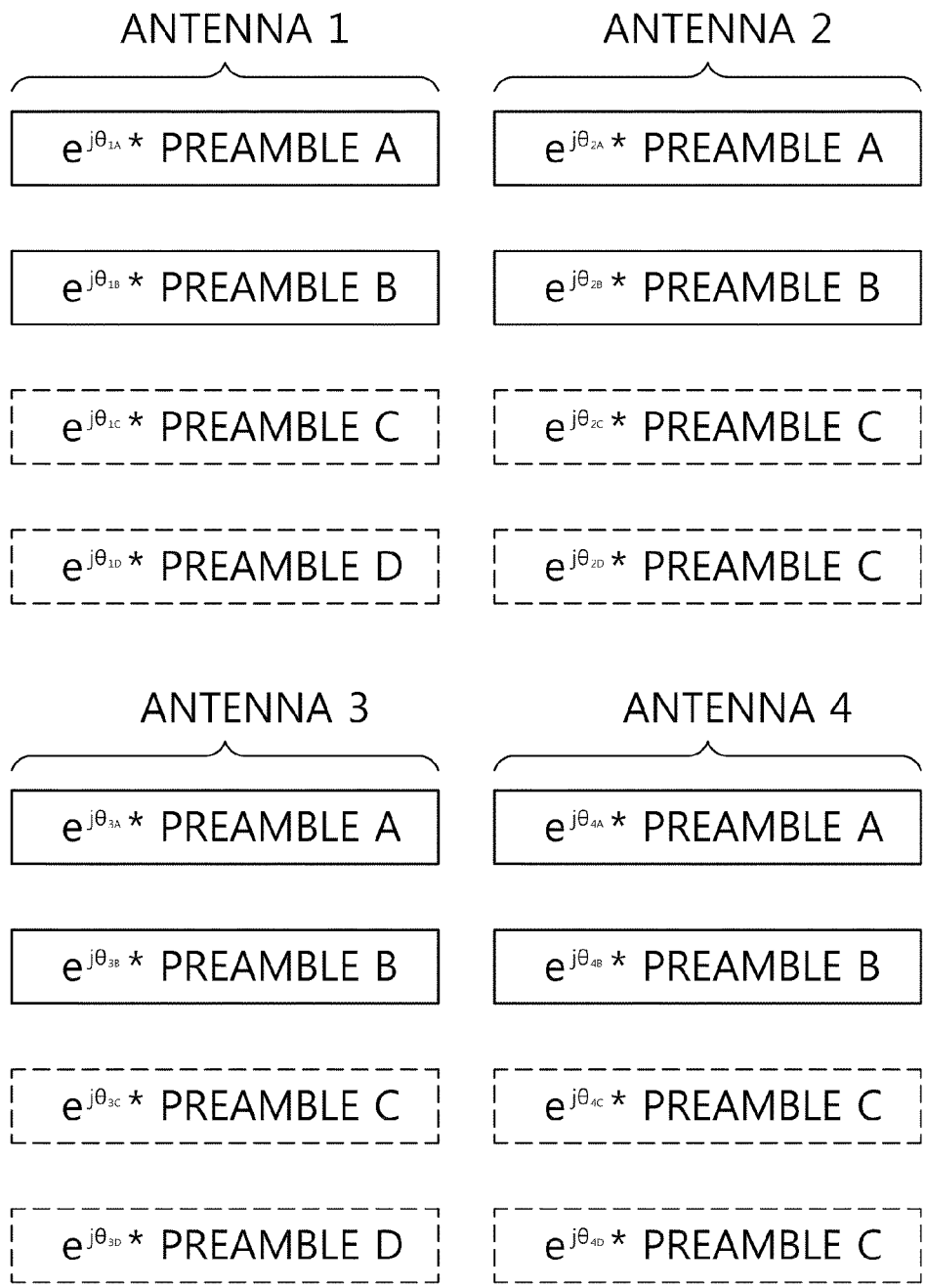
FIG. 14 shows an example of preamble transmission according to another embodiment of the present invention.

FIG. 14 shows an example of preamble transmission according to another embodiment of the present invention. In this example, a phase shift is applied when using 4 Tx antennas and 2 preambles A and B. Alternatively, when using another 2 preambles C and D (indicated by a dotted line in FIG. 14), the 4 preambles A, B, C, and D can be transmitted through the respective Tx antennas in total. The preambles A and B (or the preambles A, B, C, and D) are transmitted using interlaced subcarriers through a $1^{st}$ Tx antenna. The preambles A and B (or the preambles A, B, C, and D) are transmitted using interlaced subcarriers through a $2^{nd}$ Tx antenna. In this case, a different phase can be applied for each Tx antenna and/or for each preamble.

Figure 15:
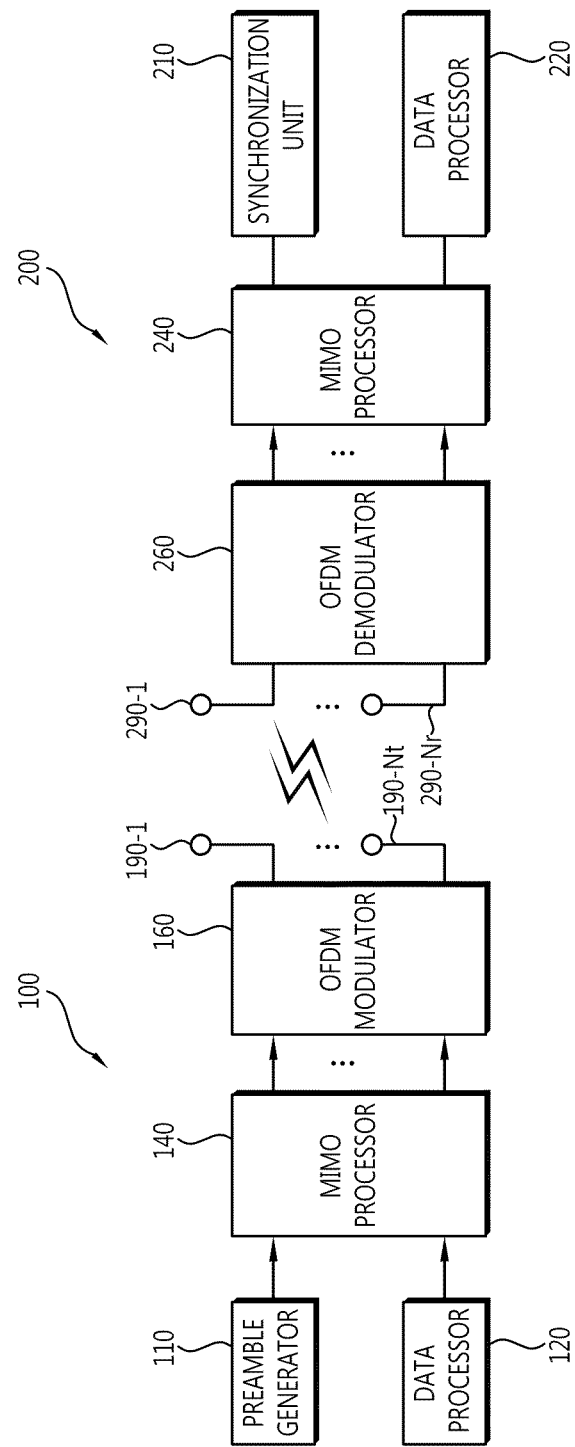
FIG. 15 is a block diagram showing a transmitter and a receiver according to an embodiment of the present invention.

FIG. 15 is a block diagram showing a transmitter and a receiver according to an embodiment of the present invention.

Referring to FIG. 15, a transmitter 100 includes a preamble generator 110, a data processor 120, a MIMO processor 140, and an orthogonal frequency division multiplexing (OFDM) modulator 160. Further, the transmitter 100 includes Nt Tx antennas 190-1, ..., 190-Nt. The preamble generator 110 generates a plurality of preambles transmitted through the plurality of Tx antennas 190-1, ..., 190-Nt according to the predetermined preamble generation method. A masking sequence may be applied to the plurality of preambles. Alternatively, the plurality of preambles may be arranged in interlaced subcarriers, or may be arranged with a specific subcarrier spacing.

The data processor 120 processes user data. The MIMO processor 140 performs various pre-processing operations according to a MIMO scheme. For example, the MIMO processor 140 may use a well-known MIMO scheme such as a cyclic delay diversity (CDD), a space frequency block code (SFBC), and a space time block code (STBC). The OFDM modulator 160 modulates a received Tx stream by using an OFDM scheme, and generates an OFDM symbol. The OFDM symbol is transmitted through the multiple antennas 190-1, ..., 190-Nt.

A receiver 200 includes a synchronization unit 210, a data processor 220, a MIMO processor 240, and an OFDM demodulator 260. The receiver 200 uses Nr Rx antennas 290-1, ..., 290-Nr. Rx signals received through the Rx antennas 290-1, ..., 290-Nr are demodulated by the OFDM demodulator 260. Demodulated streams are post-processed by the MIMO processor 240. The synchronization unit 210 attains synchronization between the transmitter 100 and the receiver 200 by detecting a preamble. If the transmitter 100 is a part of a BS and the receiver 200 is a part of a UE, the synchronization unit 210 attains downlink synchronization. The data processor 220 restores original data by performing a process corresponding to the data processor 120 of the transmitter 100.

Although OFDM is used as a multiple-access scheme in the above description, this is for exemplary purposes only. Thus, the transmitter 100 and the receiver 200 may use a well-known multiple-access scheme such as CDMA, TDMA, etc.

The present invention can be implemented with hardware, software or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claims is:

1. A method of transmitting a preamble for synchronization in a multiple-antenna system, the method comprising:
   selecting a masking sequence among a plurality of masking sequences;
   applying the masking sequence to a plurality of preambles; and
   transmitting each of the plurality of preambles, to which the masking sequence is applied, through each of a plurality of transmit antennas simultaneously,
   wherein a length of the masking sequence is equal to a number of the plurality of transmit antennas,
   and the plurality of masking sequences are orthogonal to one another,
   and the number of the plurality of masking sequences is equal to the number of the plurality of transmit antennas, and a different masking sequence is applied at N transmission times of the plurality of preambles, wherein the N is the number of the plurality of transmit antennas, and
   wherein the plurality of masking sequences are generated by using different cyclic shifts from a basis sequence.

2. The method of claim 1, wherein the plurality of preambles are transmitted periodically.

3. A transmitter comprising:
   a plurality of transmit antennas; and
   a preamble generator configured for
   selecting a masking sequence among a plurality of masking sequences;
   applying the masking sequence to a plurality of preambles; and
   transmitting each of the plurality of preambles, to which the masking sequence is applied, through each of a plurality of transmit antennas simultaneously,
   wherein a length of the masking sequence is equal to a number of the plurality of transmit antennas,
   and the plurality of masking sequences are orthogonal to one another,
   and the number of the plurality of masking sequences is equal to the number of the plurality of transmit antennas, and a different masking sequence is applied at N transmission times of the plurality of preambles, wherein the N is the number of the plurality of transmit antennas, and
   wherein the plurality of masking sequences are generated by using different cyclic shifts from a basis sequence.

4. The transmitter of claim 3, wherein the plurality of preambles are transmitted periodically.

* * * * *